Patented Oct. 27, 1953

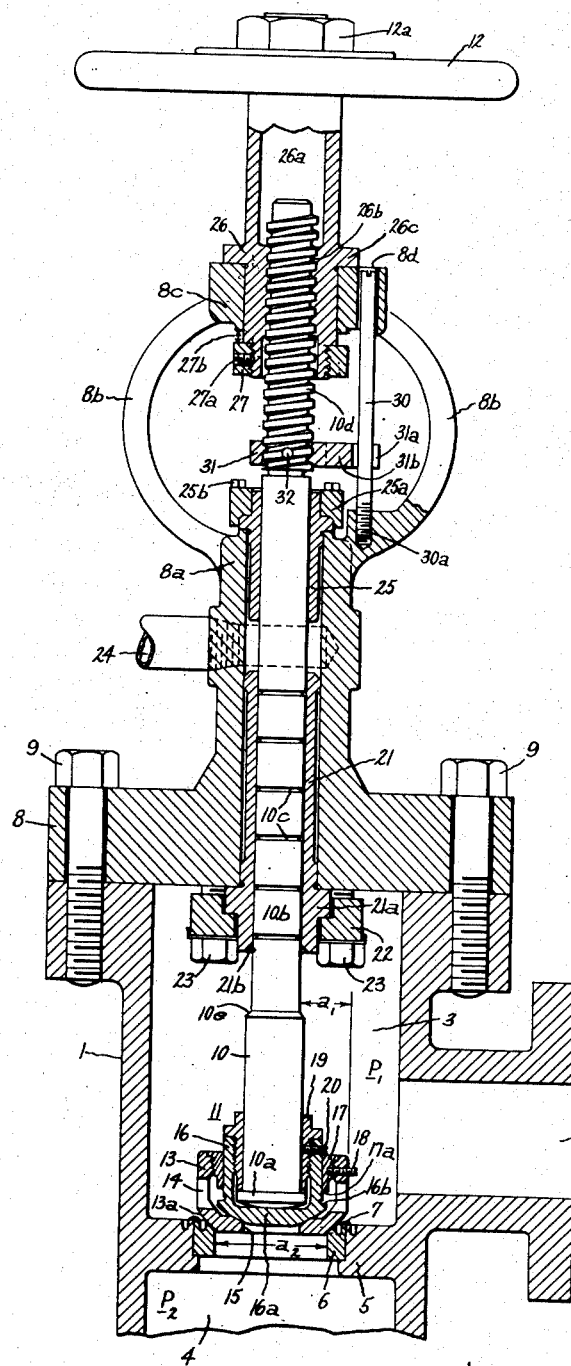

2,657,005

UNITED STATES PATENT OFFICE 2,657,005

VALVE WITH STEM SEALING ARRANGEMENT

Francis H. Van Nest, Marblehead, Mass., assignor to General Electric Company, a corporation of New York Application March 7, 1951, Serial No. 214,323

1 Claim. (Cl. 251—32)

This invention relates to valves for controlling the flow of elastic fluid, particularly to a shut-off valve for high temperature high pressure steam turbines.

As the temperature of turbine motive fluid has been raised above 750° F., it has been necessary to abandon the so-called "soft" packing materials formerly used to prevent leakage in valves and similar components, and instead employ carefully machined bushings to eliminate leakage. Maintaining sufficiently close clearances to prevent leakage in such parts is difficult because of the design problems introduced by differential thermal expansion when the turbine heats and cools rapidly. For this reason it is difficult to prevent leakage along the stem of a valve with so-called "packless glands" known to the prior art. One known way to prevent such leakage is to provide the actuating stem with a tapered annular shoulder adapted to engage a conical seat on an adjacent stationary member of the valve assembly.

An object of the present invention is to provide an improved valve arrangement of the type described specially arranged to insure that the sealing shoulder on the valve stem will be positively forced into engagement with its conical seat to effectively prevent leakage along the stem.

A further object is to provide a stem-sealed valve assembly, with means for preventing the stem from being manually actuated to such a position that differential thermal expansion can result in excessive stresses in the parts or damage to the valve stem.

Other objects and advantages will become apparent from the following description, taken in connection with the accompanying drawing in which the single figure represents a sectional view of a valve assembly incorporating the invention.

Generally, the invention is practiced by providing a freely slidable bushing in which the valve stem is threaded for longitudinal movement, so arranged that the fluid pressure distribution on the flow control member causes the bushing to automatically slide longitudinally when the valve is opened, so that the sealing shoulder on the stem is positively forced by fluid pressure against its conical seat on the housing.

Referring now more particularly to the drawing, the invention is shown as applied to a high temperature high pressure turbine stop valve having a housing 1 with a flanged inlet opening at 2 and defining an inlet chamber 3 and an outlet chamber 4 with a wall portion 5 supporting a valve seat member 6 defining the opening for communicating the inlet chamber 3 with the outlet chamber 4. Seat member 6 may be secured in wall 5 by any suitable means, such as the weld shown at 7.

The valve stem assembly, including means for positioning the stem and the flow control member proper, is supported on a removable cover member 8 secured to valve body 1 by a plurality of threaded fastenings 9. The valve stem 10 carries the flow controlling disk assembly 11 and is provided at its opposite end with actuating means represented diagrammatically by the hand-wheel 12.

The valve disk assembly 11 comprises a main cup or "disk" member 13 defining a plurality of circumferentially spaced ports 14 and a central bottom opening 15. The outer disk member 13 is adapted to slide axially on the inner member 16, the latter having a bottom wall portion 16a adapted to close the port 15 in disk 13. A circumferential shoulder 16b is adapted to engage the end surface of a bushing 17 which has a bore slidably receiving the inner disk 16 and is in turn threaded into the outer disk member 13. Accidental loosening of bushing 17 may be prevented by a lock screw 18. The inner disk member 16 is secured to the end of valve stem 10 by means of a connecting bushing 19 threadedly received in disk member 16. Connecting bushing 19 may be locked against accidental unthreading by a set-screw 20 and has an end surface adapted to engage a circumferential flange member 10a formed on the valve stem, in a manner which will be apparent from the drawing. The outer surface of disk 13 has a spherical portion adapted to seat on a mating conical surface of ring 6.

It will be appreciated by those skilled in the art that this valve disk assembly comprises a "pilot valve" arrangement by reason of which the operating force required to open the valve is reduced. When the valve stem 10 rises, the inner disk 16 first slides longitudinally in the bushing 17, with the result that disk portion 16a uncovers the port 15 in the outer disk 13. Thus fluid from the inlet chamber 3 enters the ports 14 and discharges through the central port 15, in order to reduce somewhat the pressure differential across the valve disk assembly before the main disk member 13 moves. After stem 10 has risen a preselected distance, determined by the engagement of annular shoulder 16b with the end surface 17a of connecting bushing 17, further movement upward of stem 10 will lift the main valve disk 13 so that fluid flows through the full opening in the valve seat member 6.

For slidably supporting valve stem 10 in the frame member 8, a bushing 21 is provided. This has an axial bore adapted to receive the stem 10 and an end flange portion 21a adapted to be clamped to cover 8 by means of a retaining ring 22 and a plurality of suitable threaded fastenings 23.

The bore of the stem support bushing 21 is carefully finished to accurate dimensions so that the clearance between stem portion 10b and the bushing is just sufficient to prevent sticking of the stem. Because impurities present in the steam may get into this space and cause sticking, the clearance must be sufficiently large so that the gradual accumulation of such impurities in the clearance space will not cause the stem to "freeze" in the bushing. This is of course particularly important where the valve is used as the shut-off or emergency stop valve in a steam turbine.

To reduce the tendency for motive fluid to leak along the stem, the portion 10b may be provided with a plurality of axially spaced circumferential sealing grooves 10c, in accordance with common practice in the art. Any fluid which does leak along the stem may be bled off through a drainage port 24. Above this drainage port a second bushing member 25 is provided, which bushing is retained in place in the housing portion 8a by a cover ring 25a secured to housing portion 8a by a plurality of suitable threaded fastenings 25b.

The mechanism for axially positioning the valve stem 10 comprises an actuating bushing member 26 disposed for limited axial sliding movement in the housing portion 8c, which is supported from cover portion 8a by means of a plurality of circumferentially spaced arms 8b. As will be apparent from the drawing, the actuating bushing 26 is rotatably disposed in the housing portion 8c and carries the hand-wheel 12 at its upper end. Bushing 26 has a central axial bore 26a including a portion threaded at 26b. This thread 26b is adapted to engage the threaded portion 10d of the valve stem 10 for raising and lowering the stem upon rotation of hand-wheel 12.

The actuating bushing 26 has a lower threaded end portion carrying an abutment in the form of a nut 27 adapted to limit the upward sliding movement of the bushing by engagement with the adjacent portion of housing 8c. The extent of this limited axial sliding of bushing 26 is indicated at 27b in the drawing.

With this arrangement, it is necessary that the threaded valve stem 10 be prevented from rotating when the hand-wheel 12 is turned; and to this end a guide rod 30 extends freely through a hole 8d in housing portion 8c and has a lower end portion threadedly received in housing portion 8a, as indicated at 30a. Engaging the guide rod 30 is the forked end portion 31a of a radially extending arm 31b secured to or formed integral with a threaded ring member 31, which is adjustably fixed to the threaded valve stem 10d, as for instance by a lock-screw 32. This ring member 31 serves as another movement-limiting abutment, the purpose of which will be described hereinafter.

The method of operation of this improved valve assembly is as follows. When in the closed position, shown in the drawing, the inner valve disk member 16 is in sealing engagement with the port 15 and the outer disk 13 is firmly seated on the mating conical surface of the valve seat member 6. The actuating bushing 26 is in its lowermost position with flange 26c engaging or almost engaging the housing portion 8c, and the nut 27 spaced by the clearance identified 27b from the housing. The pressure of the elastic fluid in the inlet chamber 3, acting on the annular area designated $a_1$ in the drawing, will of course hold the valve disk assembly 13, 16 in this closed position.

If now it is desired to open the valve, hand-wheel 12 is rotated in such direction as to cause the stem portion 10d to rise in the actuating bushing 26. This immediately moves the inner valve disk 16 upwardly so that fluid passes through ports 14, 15 and into the outlet chamber 4. This initial flow is of comparatively high velocity so that there is a very substantial pressure drop across the valve disk assembly, which pressure differential tends to force the stem and valve disk assembly towards its lowermost or closed position. This force holds actuating bushing flange 26c down against housing portion 8c. Continued upward movement of the valve stem 10 causes the shoulder 10b to engage bushing surface 17a and thereafter effect upward movement of the outer disk member 13. The rate of flow through the valve opening now greatly increases, with the result that the pressure in the discharge chamber 4 begins to rise and the pressure drop across the valve disk assembly decreases. It will now be observed that the inlet pressure $P_1$ in chamber 3 is exerted only on the annular area $a_1$ surrounding the valve stem 10 and represented by the projected top area of the valve disk assembly 11. On the other hand, the pressure $P_2$ in the discharge chamber 4 is exerted on the whole projected area of the lower surface of the valve disk assembly, which is substantially that area contained within the valve seat member 6, and represented by the symbol $a_2$. The actual pressure distribution on the valve disk assembly is not quite so simple with fluid flowing rapidly through the ports 14, 15 and between the spherical surface 13a of the outer disk memebr 13 and the mating seat on member 6. There may be a rather non-uniform pressure distribution on the assembly 11, the net resultant upward component of which may be represented by the pressure $P_2$ in chamber 4 exerted upwardly on some "effective area," herein identified as the area $a_2$, although it will be understood by those skilled in the art that this effective area may not be exactly equal to the area $a_2$ of the port in the seat member 6.

Thus, in the closed position the inlet pressure $P_1$ acts on the annular area $a_1$ to hold the valve disk assembly firmly in closed position against the valve seat 6; but as the valve disk 11 moves in the opening direction, the pressure drop across the disk (which pressure drop results in a downward force on the valve stem, as noted above) progressively decreases, while the discharge pressure $P_2$ (acting on the area $a_2$ in the upward direction) progressively increases. By properly proportioning the areas $a_1$ and $a_2$ it can be determined that, at a certain point in the valve stem lift, the force exerted upwardly by the pressure $P_2$ on area $a_2$ exceeds the downward force of the pressure $P_1$ on the annular area $a_1$, with the result that the weight and friction of the valve stem assembly are overcome and the pressure distribution on the disk assembly 11 causes the valve stem and actuating bushing 26 to rise, so the sealing shoulder 10e is forced tightly into engagement with the conical seat 21b on the end of bushing 21. As will be apparent from the proportions of the parts shown in the drawing, the pressure distribution on the disk assembly 11 does not have this effect until rotation of the hand-wheel 12 has first moved the stem 10 upwardly in bushing 26 so the spacing between shoulder 10e and seat 21b is somewhat less than the clearance space 27b between abutment nut 27 and housing portion 8c. In other words, the mechanical design of the parts must be so correlated with the pressure distribution occurring on the valve disk assembly 11 during the opening operation that, when the net upward force on the stem is sufficient to overcome weight and friction, the axial upward movement permitted by the clearance space 27b will insure that the annular sealing shoulder 10e is forced firmly into engagement with the conical seat 21b. During normal operation, with the valve in fully open position, the inlet pressure $P_1$ is exerted upwardly on the valve disk assembly to maintain the sealing shoulder 10e engaged with its seat 21b. This effectively prevents leakage along the valve stem.

When it is desired to return the valve to closed condition, the hand-wheel 12 is rotated in the direction to cause the threaded stem portion 10d to descend in bushing 26. This causes the sealing shoulder 10e to move away from its seat 21b, since the above-described operation has brought the abutment 27 into engagement with the under surface of housing portion 8c. Further rotation of hand-wheel 12 will cause the valve disk assembly 11 to approach its seat member 6 with the result that the outlet pressure $P_2$ decreases and the pressure drop across the valve, acting in the downward direction, progressively increases. Eventually the pressure differential across the valve is sufficient to force the stem assembly downwardly, as permitted by downward sliding movement of the bushing 26, so that the clearance space 27b opens up again, to the condition shown in the drawing.

Thus it will be apparent that, in moving to the closed position, downward sliding movement of the actuating bushing 26 automatically insures that the disk assembly will be firmly seated on ring 6 by the inlet pressure $P_1$ acting on the annular areas $a_1$. On the other hand, in moving to the fully open position, the inlet pressure $P_1$ produces an upward force on the valve stem assembly holding the sealing shoulder 10e against the seat 21b. By proper design of the valve assembly, these sealing actions are obtained automatically even in spite of careless manipulation by the operator.

The additional function of the stop ring 27 referred to above is to limit upward movement of the stem portion 10d in the threaded bushing 26 through excessive rotation of hand-wheel 12 by the operator in the valve opening direction. Analysis of the above-described method of operation will show that, after the sealing shoulder 10e is in engagement with its seat 21b, further rotation of the hand-wheel 12 will result in the actuating bushing 26 traveling downwardly on the thread 10d, with the result that careless operation of hand-wheel 12 may cause the bushing 26 to be jammed downwardly with flange 26c again firmly against housing 8c. The valve stem 10 is then tightly locked in position against axial movement in either direction; and if rapid differential thermal expansion should thereafter take place between the housing 8 and the stem 10, excessive strains may be placed on the stem, even sufficient to cause breakage. Accordingly the abutment collar 31 is so located on the thread 10d that it engages the lower end surface of bushing 26 to prevent further rotation of hand-wheel 12 when the valve stem is in full open condition. It will be observed that the axial spacing of the collar 31 from the end of bushing 26 is substantially equal to the spacing of sealing shoulder 10e from its seat 21b, meaning that the abutment 31 prevents further upward movement of threaded stem portion 10d in bushing 26 immediately after the sealing shoulder 10e engages seat 21b. Thus the abutment 31 prevents inadvertent positioning of the valve parts in the above-described "locked" condition, which might result in damage through differential thermal expansion.

It will be seen that the invention provides an improved sealing arrangement preventing leakage both in the fully opened and fully closed position, the pressure distribution around the flow control member serving to insure that the stem sealing effect will automatically be produced when the valve is moved toward the open position.

While only one embodiment has been disclosed, it will be apparent to those skilled in the art that many modifications may be made in the structure disclosed in the drawing without departing from the spirit of the invention, and it is desired to cover by the appended claim all such changes as fall within the true scope of the invention.

What I claim as new and desire to secure by Letters Patent of the United States is:

In a high pressure fluid shut-off valve having a housing with walls defining an inlet chamber and a valve seat member forming a discharge opening with a flow control member disposed in the inlet chamber and adapted in the valve closed position to be biased by inlet chamber pressure against the seat and carried by a stem slidably disposed in a supporting bushing extending through the wall of the inlet chamber, the combination of sealing means for the valve stem comprising an annular shoulder on the stem adapted when in the valve open position to engage a mating annular seat at the adjacent end of the stem support bushing, and stem positioning means comprising an actuating bushing member disposed for longitudinal sliding movement relative to a stationary housing portion and having a central axial bore threadedly engaging the valve stem whereby relative rotation of stem and bushing effects axial positioning of the stem, key means preventing rotation of the stem relative to the housing, first abutment means on the bushing and adapted to engage said housing portion for limiting longitudinal sliding movement of the actuating bushing in the valve-closing direction, a second abutment secured to the bushing and defining a preselected clearance with said housing portion when in the valve closed condition and adapted to engage said housing portion to limit sliding motion of the actuating bushing in the valve opening direction, whereby, when the flow control member is moved by rotation of the actuating bushing in the opening direction, the pressure in the inlet chamber acting on the flow control member automatically effects axial sliding movement of the stem and actuating bushing in the opening direction to bring the stem sealing shoulder into sealing engagement with the cooperating seat, the fluid pressure in the inlet chamber maintaining the stem seal shoulder in said engagement when in the normal open condition.

FRANCIS H. VAN NEST.

References Cited in the file of this patent

UNITED STATES PATENTS

| Number | Name | Date |
| --- | --- | --- |
| Re. 19,151 | Saunders | May 1, 1934 |
| 961,505 | Little | June 14, 1910 |
| 1,148,160 | Eynor | July 27, 1915 |
| 1,362,986 | Dunham | Dec. 21, 1920 |
| 1,464,303 | Whitelaw | Aug. 7, 1923 |
| 1,905,014 | Teller | Apr. 25, 1933 |
| 1,968,779 | Johnsen | July 31, 1934 |
| 2,049,516 | Ruhstorfer | Aug. 4, 1936 |

FOREIGN PATENTS

| Number | Country | Date |
| --- | --- | --- |
| 700,250 | Germany | of 1940 |